US009282070B2

(12) United States Patent
Haugen et al.

(10) Patent No.: US 9,282,070 B2
(45) Date of Patent: Mar. 8, 2016

(54) DYNAMIC DELAY IN UNDO FUNCTIONALITY BASED ON EMAIL MESSAGE CHARACTERISTICS

(75) Inventors: Frances Bordwell Haugen, Mountain View, CA (US); Daniel Mark Crichton, Eden Prairie, MN (US)

(73) Assignee: Google Inc., Mountain View, CA (US)

( * ) Notice: Subject to any disclaimer, the term of this patent is extended or adjusted under 35 U.S.C. 154(b) by 585 days.

(21) Appl. No.: 13/601,719

(22) Filed: Aug. 31, 2012

(65) Prior Publication Data
US 2015/0195232 A1  Jul. 9, 2015

Related U.S. Application Data

(60) Provisional application No. 61/670,063, filed on Jul. 10, 2012.

(51) Int. Cl.
*G06F 15/16* (2006.01)
*H04L 12/58* (2006.01)
*H04L 12/875* (2013.01)

(52) U.S. Cl.
CPC ............... *H04L 51/18* (2013.01); *H04L 47/56* (2013.01)

(58) Field of Classification Search
CPC ....... H04L 47/56; H04L 47/566; H04L 51/12; H04L 51/26; H04L 61/307; H04L 63/0227; H04L 63/0263; H04L 65/1079; H04N 1/00209; G06Q 10/107
See application file for complete search history.

(56) References Cited

U.S. PATENT DOCUMENTS

| 6,757,530 | B2 * | 6/2004 | Rouse ................... H04M 3/493 455/412.1 |
| 6,757,830 | B1 * | 6/2004 | Tarbotton et al. ............. 713/188 |
| 8,775,341 | B1 * | 7/2014 | Commons ............ G06N 3/0454 706/20 |
| 2002/0013692 | A1 * | 1/2002 | Chandhok ............ G06Q 10/107 704/1 |
| 2004/0030753 | A1 * | 2/2004 | Horvitz ................ G05B 19/404 709/206 |
| 2004/0219928 | A1 * | 11/2004 | Deeds ................. H04M 1/2745 455/456.1 |
| 2009/0006464 | A1 * | 1/2009 | Churchill .......... G06F 17/30569 |
| 2009/0006561 | A1 * | 1/2009 | Burckart .............. G06Q 10/107 709/206 |
| 2009/0228558 | A1 * | 9/2009 | Brenner ............... G06Q 10/107 709/206 |
| 2011/0225254 | A1 * | 9/2011 | Atkins ................. G06Q 10/107 709/206 |
| 2012/0259989 | A1 * | 10/2012 | Cousins ................ H04L 47/263 709/228 |
| 2013/0166657 | A1 * | 6/2013 | Tadayon ........... H04M 1/72552 709/206 |
| 2013/0332525 | A1 * | 12/2013 | Liu ...................... G06Q 10/109 709/204 |

* cited by examiner

*Primary Examiner* — Ario Etienne
*Assistant Examiner* — Kidest Mendaye
(74) *Attorney, Agent, or Firm* — McDermott Will & Emery LLP

(57) ABSTRACT

A system and machine-implemented method for calculating a dynamic delay for an email message, the method including receiving an indication of an email message being created by a user, identifying one or more characteristics of the email message in response to receiving the indication, determining an impact associated with the email message based on one or more of the identified one or more characteristics of the email message or one or more behavioral information regarding the user sending the email message, determining a customized delay for the email message based on the determined impact, the delay comprising a length of time and delivering the email message to one or more recipients of the email message after the length of time has elapsed.

20 Claims, 3 Drawing Sheets

DYNAMIC DELAY IN UNDO FUNCTIONALITY BASED ON EMAIL MESSAGE CHARACTERISTICS

CROSS-REFERENCE TO RELATED APPLICATION

The present application claims the benefit of U.S. Provisional Patent Application Ser. No. 61/670,063, entitled "Dynamic Delay in Undo Functionality Based on Email Message Characteristics," filed on Jul. 10, 2012, which is hereby incorporated by reference in its entirety for all purposes.

BACKGROUND

The subject disclosure generally relates to increasing performance of websites and web applications, and, in particular, to increasing website load time.

Mistakes in outgoing communication email messages are an ongoing issue for users. Users may suddenly realize that there is something wrong with an email message just moments after it was sent. Similarly, someone who leaves a particularly stressful meeting may send a negative or angry email message in haste, without realizing the consequences before it is sent to potentially thousands of people. While various email message systems occasionally offer undo options (e.g., recall option), the recall delay is usually very short and is the same amount of time for all email messages regardless of the content or context of the email message.

For example email message services may offer a recall or undo feature that provides the user a quick window to revert their sent email message back to a draft state before it is actually sent. However, this delay is only temporary, and can be very short (e.g., changing to another part of the email message client will prevent the user from activating the undo action). Therefore, the time delay is effectively only a handful of seconds for most users.

Thus, it may be desirable to facilitate providing a longer recall delay of allowing a user to undo their email messages based on the specific characteristics of the user and/or the email message.

SUMMARY

The disclosed subject matter relates to a machine-implemented method for calculating a dynamic delay for an email message, the method comprising receiving an indication of an email message being created by a user. The method comprising identifying one or more characteristics of the email message in response to receiving the indication. The method comprising determining an impact associated with the email message based on one or more of the identified one or more characteristics of the email message or one or more behavioral information regarding the user sending the email message. The method further comprising determining a customized delay for the email message based on the determined impact, the delay comprising a length of time and delivering the email message to one or more recipients of the email message after the length of time has elapsed.

The disclosed subject matter also relates to a system for calculating a dynamic delay for an email message, the system comprising one or more processors and a machine-readable medium comprising instructions stored therein, which when executed by the processors, cause the processors to perform operations comprising receiving an indication of an email message being created by a user to be sent to one or more recipients. The operations further comprising determining an impact score associated with the email message based on one or more characteristics of the email message or one or more behavioral characteristics of the user in response to receiving the indication. The operations further comprising calculating a dynamic delay for the email message based on the determined impact score, the delay comprising a length of time proportional to the calculated impact score and causing the delivery of the email message to the one or more recipients to be delayed by the length of time of the dynamic delay.

The disclosed subject matter also relates to a machine-readable medium comprising instructions stored therein, which when executed by a machine, cause the machine to perform operations comprising receiving an indication of an email message being created by a user. The operations further comprising identifying one or more characteristics of the email message in response to receiving the indication, the one or more characteristics including one or more of information regarding a number of recipients of the email message, information regarding the content of the email message. The operations further comprising identifying one or more behavioral characteristics of the user. The operations further comprising determining an impact associated with the email message based on one or more of the identified one or more characteristics of the email message or the identified one or more behavioral characteristics of the user. The operations further comprising calculating a customized delay for the email message based on the determined impact, the delay comprising a length of time for delaying the delivery of the email message to the recipients of the email message.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
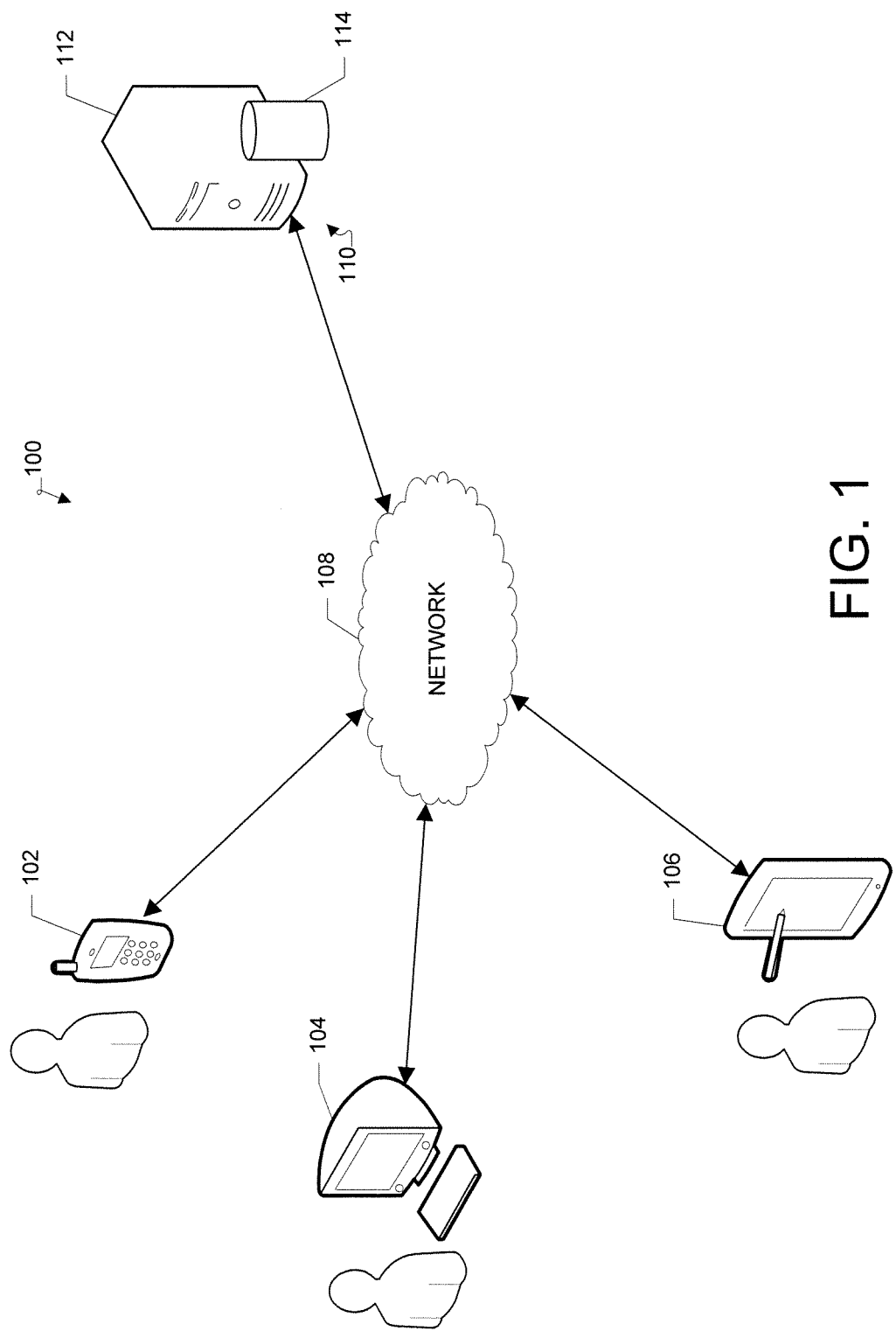
FIG. 1 illustrates an example client-server network environment which provides for facilitating dynamic delay in undo functionality for email messages.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The present disclosure provides a system and method for creating a dynamic delay in the undo functionality based on the characteristics of an email message. Email message characteristics may include the content of the email message, the recipients of the email message, the device from which the email message is sent, the context of the email message (e.g., time and day when the email message is sent) and/or the sender behavior and characteristics. The system may calculate a delay for an email message according to the characteristics of the email message and may append the delay to the email message, such that the delivery of the email message is delayed for a time period equal to the delay. In this time window, the user is able to undo the request to send the email message. Once the user requests to undo the request to send the email message, the email message may revert back to its draft form or may be deleted (e.g., based on system and/or user settings).

The length of the dynamic delay may be calculated either in real-time, while the user is drafting the email message up to the time the user requests to send the email message, or may be calculated once the user requests to send the email message. The present system may reside at the email message client or at a server and the calculation may be performed locally or using asynchronous calls to the server.

The system may calculate an impact score corresponding to the impact of an email message (i.e., the likelihood that the user may wish to undo the email message). The system the assigns a delay to the email message based on the impact score. The amount of delay associated with an impact score may be calculated according to a proportional-integral-derivative (PID) algorithm, which calculates an "error" value as the difference between a measured process variable and a desired setpoint. The algorithm attempts to minimize the error by adjusting the process control inputs. The system assigns a first delay to an email message having an impact score and/or one or more specific characteristics, and adjusts the delay until the delay is at a point for a specific impact score and/or characteristics, that provides an optimal delay for the user sending the email message (e.g., a threshold number of users typically don't force send the message before the delay has lapsed and/or do not request to undo the request to send the email after the delay has expired).

The delay may also be assigned based on other methods, according to the impact score, and may include a consideration of the historical behavior of the user, or a collection of users with respect to one or more email messages. Furthermore, the delay may be at least partially based upon an explicitly assigned delay or offset set by the user for a specific set of characteristics or impact scores. According to the characteristics of the email message, an algorithmically controlled delay is calculated for each email message and appended to the email message send request. In one aspect, the email message is placed in the outbox at the email message client (e.g., at the client device) for the calculated delay. Alternatively, the email messages may be sent to a server, and the server delays the delivery of the email message according to the delay. In another instance, the email message may be delivered to the recipient but is not made visible to the recipient until a time equal to the dynamic delay has passed. During the delay time period, the email message can be cancelled, i.e., the undo functionally may be performed, or may be forced to send by the user (e.g., forced to send before the delay has been terminated). Where the email message is forced to send, the system may record the behavior of the user, and such information may be used to adjust the delay calculation for future email messages.

The calculation of the delay may take into account several factors in determining the length of the delay in sending the email message. The first factor may be the number of recipients of the email message, with the assumption that a larger number of recipients increases the impact of the email message and thus a longer delay may be desirable. Information on the number of members for mailing lists and groups could be integrated into the mail client and may be used to determine the number of recipients when the email message is addressed to a mailing list or group. Furthermore, the system may have an importance associated with a group of recipients (e.g., explicitly listed by the user, based on an organizational chart, or based on administrative settings) and may assign a longer delay to an email message being sent to users being identified as an important recipient (e.g., when sending email messages to clients, president of company, boss).

Furthermore, the content if an email message may be considered when determining delay associated with the email message (e.g., when calculating the impact score). The system may perform sentiment analysis using natural language processing to determine the impact of an email message. For example, email messages can be rated based on the emotions portrayed within the email message (e.g., anger), and the delay can be increased for negative emotions. Unusual numbers of typos or other degradations in text quality may also be a factor in determining the length of delay for an email message. The date and time of an email message may also indicate a likelihood that a longer delay should be assigned to an email message (e.g., an email message sent on midnight on a Saturday might be an indication of drunk messaging, and a longer delay could be provided).

Additionally, the user behavior may be taken into account when calculating the impact score of email messages sent by the user. For example, the speed at which a user is sending email messages may be used as a factor in determining the length of delay (e.g., the speed may indicate higher possibility of errors or on the other hand may indicate urgency). The system may also base the calculation of the impact score on the type of device the email message is being sent from. The system may assign the length of delay at least in part based on the type of device used to send the email message (e.g., email message sent by a phone may be more prone to errors). The delay may also be weighed or varied based on a level of urgency of the email message, either explicitly expressed or inferred from a user's activity or context of the email message (e.g., time of day, recipients, urgency flags or language indicating urgency).

Furthermore, in some aspects, user or administrative settings may provide a scalar factor for varying the calculated delay (e.g., a cautious person may desire a longer delay, or certain times of the day may require shorter delays because they are urgent). One or more of the factors may be considered either alone, or in combination, when determining the impact score associated with the email message. When calculating the impact score, one or more factors may be weighted (e.g., according to historical information or explicit weights, priorities or importance assigned by the system and/or user setting). The impact score may be used to assign a specific delay (i.e., a time period) to the email message.

Once a delay is calculated for an email message, the system may automatically append the delay to the email message. The user may override the assigned delay using a user interface element presented that would allow the user to force send the email message at any time.

FIG. 1 illustrates an example client-server network environment which provides for facilitating dynamic delay in undo functionality for email messages. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to assist in calculating a dynamic delay for a specific email message sent from the electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

The system (e.g., hosted at server 110), may detect an email message being drafted or a request to send an email message through a client device (e.g., electronic devices 102, 104 or 106). Upon detecting an email message, the system, identifies one or more characteristics associated with the email message, and calculates an impact score (or other indication of the characteristics of the email message). The impact score is then used to assign a specific delay to the email message.

The length of the dynamic delay may be calculated either in real-time while the user is drafting the email message up to the time the user requests to send the email message, or may be calculated once the user requests to send the email message. The present system may reside at the email message client or at a server and the calculation may be performed locally or using asynchronous calls to the server.

In one aspect, the email message will be placed in the outbox at the email message client (e.g., at an electronic device 102, 104 or 106) for the calculated delay. Alternatively, the email messages may be sent to a server (e.g., server 110), and the server will delay the delivery of the email message according to the delay. In another instance, the email message may be delivered to the recipient (e.g., at an electronic device 102, 104 or 106) but is not made visible to the recipient until a time equal to the dynamic delay has passed. During the delay time period, the email message can be cancelled, i.e., the undo functionally may be performed, or may be forced to send by the user (e.g., forced to send before the delay has been terminated).

Figure 2:
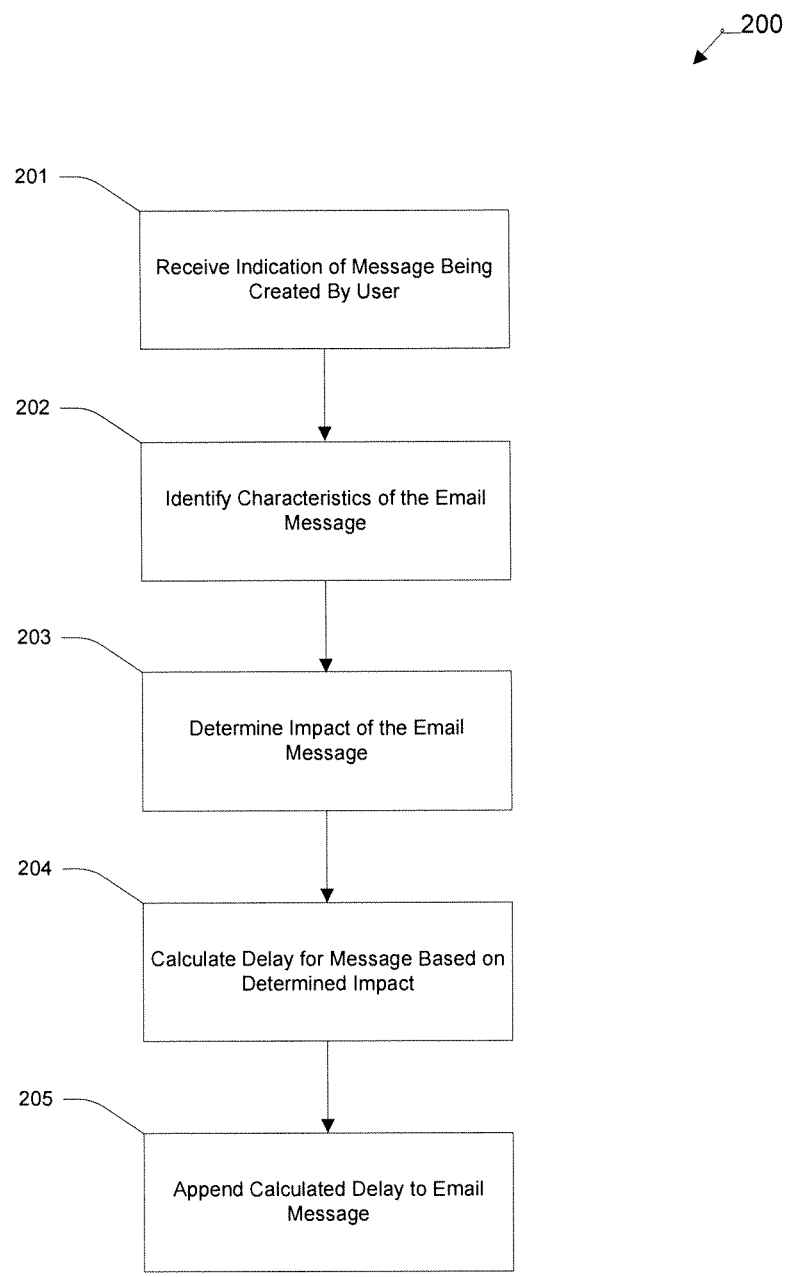
FIG. 2 illustrates a flow diagram of an example process for calculating a dynamic delay for an email message.

FIG. 2 illustrates a flow diagram of an example process 200 for calculating a dynamic delay for an email message. The process 200 generates a dynamic delay for an email message based on the characteristics of the email message. The delay provides a time period where the user is able to utilize the undo functionality with respect to the email message. In block 201, the system receives an indication of an email message being created by a user. The indication may be received when the user begins drafting an email message and/or when the user requests to send the email message, or may occur at some time during the email message drafting process (e.g., when the user enters the recipients).

In block 202, the system identifies one or more characteristics of the email message. Email message characteristics may include the content of the email message, the recipients of the email message, the device from which the email message is sent, or the context of the email message (e.g., time and day when the email message is sent) and/or the sender behavior and characteristics. For example, the system may determine information regarding the recipients of the email message including the number of recipients. Recipients of the email message may include individual recipients and/or mailing lists or other groups (e.g., social groups). The system, may determine the number of recipients including the number of recipients within a mailing list or group.

In addition, for the identified recipients, the system may also determine an importance associated with one or more of the recipients. The importance may be reflected for example within an organizational chart associated with the user, or may be based upon importance or priority explicitly assigned by the user or inferred by the system according to historical information. For example, the system may determine if any of the recipients have been historically linked with a higher chance of the user wishing to use the undo functionality, thus indicating that the user may be an important user. Additionally, the system may identify context information regarding the email message, such as time of day, number of email messages sent by the user (e.g., within a specific period of time preceding the email message), the speed at which the user is sending email messages over a period of time. The system may additionally identify the content of the email message, including the subject, the content within the body of the email messages and/or the content within one or more attachments.

In block 203, the system determines an impact associated with the email message. The impact indicates the likelihood that a user may wish to undo, i.e., cancel or modify, the email message, after requesting to send the email message. The calculation of the impact of the email message may be based upon the identified characteristics and other similar factors. The first factor may be the number of recipients of the email message, with the assumption that a larger number of recipients increases the impact of the email message, and thus a longer delay may be desirable for the email message. Information on the number of members for mailing lists and groups could be integrated into the mail client to provide for determining the number of recipients when the email message is addressed to a mailing list or group. Furthermore, the system may have an importance associated with a group of recipients (e.g., explicitly listed by the user, based on an organizational chart, or based on administrative settings) and may assign a longer delay to an email message being sent to users being identified as an important recipient (e.g., when sending email messages to clients, president of company, boss).

The content of an email message may also be considered when determining delay associated with the email message (e.g., when calculating the impact score). The system may perform sentiment analysis using natural language processing to determine the impact of an email message. For example, email messages can be rated based on the emotions portrayed within the email message (e.g., anger), and the delay can be increased for negative emotions. Unusual numbers of typos or other degradations in text quality may also be a factor in determining the length of delay for an email message. The date and time of an email message may also be an indication of the impact of the email message (e.g., an email message sent on midnight on a Saturday might be an indication of drunk messaging, and a longer delay could be provided).

Additionally, the user behavior may be taken into account when calculating the impact score of email messages sent by the user. For example, the speed at which a user is sending email messages may be used as a factor in determining the length of delay (e.g., the speed may indicate higher possibility of errors or on the other hand may indicate urgency). The system may also base the calculation of the impact score on the type of device the email message is being sent from. The system may assign the length of delay at least in part based on the type of device used to send the email message (e.g., email message sent by a phone may be more prone to errors). The delay may also be weighed or varied based on a level of urgency of the email message, either explicitly expressed or inferred from a user's activity or context of the email message (e.g., time of day, recipients, urgency flags or language indicating urgency).

Furthermore, in some aspects, user or administrative settings may provide a scalar factor for varying the calculated delay (e.g., a cautious person may desire a longer delay, or certain times of the day may require shorter delays because they are urgent). One or more of the factors may be considered either alone, or in combination, when determining the impact associated with the email message.

For example the system may determine an impact score for the email message according to the one or more factors. When calculating the impact score, one or more factors may be weighted (e.g., according to historical information or explicit weights, priorities or importance assigned by the system and/or user setting).

In block 204, the system calculates a delay for the email message according to the determined impact associated with the email message. The impact score may be used to assign a specific delay (i.e., a time period) to the email message. The amount of delay associated with an impact score may be calculated according to a proportional-integral-derivative (PID) algorithm, which calculates an "error" value as the difference between a measured process variable and a desired set point. The algorithm minimizes the error by adjusting the process control inputs.

The system, assigns a first delay to an email message having an impact score and/or one or more specific characteristics, and adjusts the delay until the delay is at a point for a specific impact score and/or characteristics, that provides an optimal delay for the user sending the email message. The delay may also be assigned based on other methods and/or algorithms, according to the impact score, and may include a consideration of the historical behavior of the user, or a collection of users with respect to one or more email messages. Furthermore, the delay may be at least partially based upon an explicitly assigned delay or offset set by the user for a specific set of characteristics or impact scores.

In block 205, the system appends the calculated delay to the email message. The system may calculate a delay for an email message according to the characteristics of the email message and may append the delay to the email message, such that the delivery of the email message is delayed for a time period equal to the delay. In this time window, the user is able to undo the request to send the email message. Once the user requests to undo the sending of the email message, the email message may revert back to its draft form or may be deleted (e.g., based on system and/or user settings).

In one aspect, the email message will be placed in the outbox at the email message client (e.g., at the client device) for the calculated delay. Alternatively, the email messages may be sent to a server, and the server will delay the delivery of the email message according to the delay. In another instance, the email message may be delivered to the recipient but is not made visible to the recipient until a time equal to the dynamic delay has passed. During the delay time period, the email message can be cancelled, i.e., the undo functionally may be performed, or may be forced to send by the user (e.g., forced to send before the delay has been terminated). Where the email message is forced to send, the system may record the behavior of the user, and such information may be used to adjust the delay calculation for future email messages.

The length of the dynamic delay may be calculated either in real-time while the user is drafting the email message up to the time the user requests to send the email message, or may be calculated once the user requests to send the email message. The present system may reside at the email message client or at a server and the calculation may be performed locally or using asynchronous calls to the server. Once a delay is calculated for an email message, the system may automatically append the delay to the email message. The user may override the assigned delay using a user interface element presented that would allow the user to force send the email message at any time.

While the present disclosure is described with respect to an email message, it should be understood by one skilled in the art that the above processes may be performed with respect to any messages or other communication between users where dynamic delay in undo functionality may be desirable. For example, similar processes may be performed with respect to social networking posts and/or blog entries.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 3:
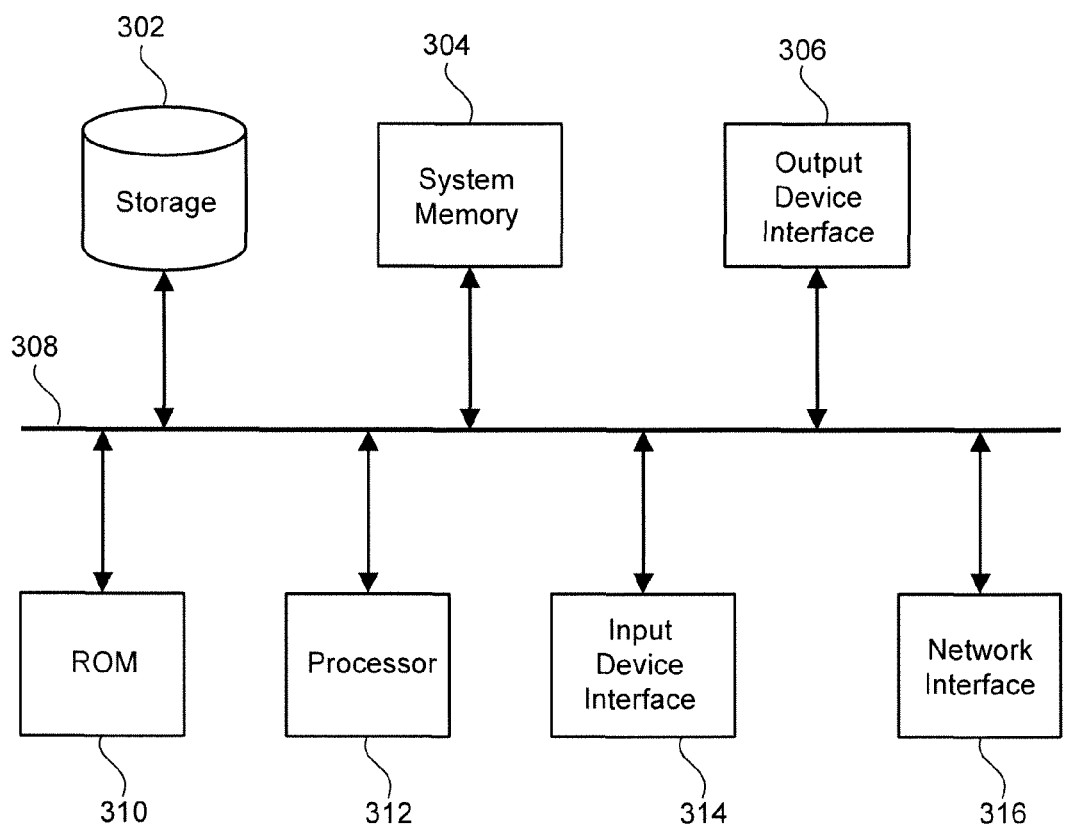
FIG. 3 conceptually illustrates an electronic system with which some implementations of the subject technology are implemented.

FIG. 3 conceptually illustrates an electronic system with which some implementations of the subject technology are implemented. Electronic system 300 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 300 includes a bus 308, processing unit(s) 312, a system memory 304, a read-only memory (ROM) 310, a permanent storage device 302, an input device interface 314, an output device interface 306, and a network interface 316.

Bus 308 collectively represents all system, peripheral, and chipset buses that communicatively connect the numerous internal devices of electronic system 300. For instance, bus 308 communicatively connects processing unit(s) 312 with ROM 310, system memory 304, and permanent storage device 302.

From these various memory units, processing unit(s) 312 retrieves instructions to execute and data to process in order to execute the processes of the subject disclosure. The processing unit(s) can be a single processor or a multi-core processor in different implementations.

ROM 310 stores static data and instructions that are needed by processing unit(s) 312 and other modules of the electronic system. Permanent storage device 302, on the other hand, is a read-and-write memory device. This device is a non-volatile memory unit that stores instructions and data even when electronic system 300 is off. Some implementations of the subject disclosure use a mass-storage device (such as a magnetic or optical disk and its corresponding disk drive) as permanent storage device 302.

Other implementations use a removable storage device (such as a floppy disk, flash drive, and its corresponding disk drive) as permanent storage device 302. Like permanent storage device 302, system memory 304 is a read-and-write memory device. However, unlike storage device 302, system memory 304 is a volatile read-and-write memory, such a random access memory. System memory 304 stores some of the instructions and data that the processor needs at runtime. In some implementations, the processes of the subject disclosure are stored in system memory 304, permanent storage device 302, and/or ROM 310. For example, the various memory units include instructions for calculating a dynamic delay according to various embodiments. From these various memory units, processing unit(s) 312 retrieves instructions to execute and data to process in order to execute the processes of some implementations.

Bus 308 also connects to input and output device interfaces 314 and 306. Input device interface 314 enables the user to communicate information and select commands to the electronic system. Input devices used with input device interface 314 include, for example, alphanumeric keyboards and pointing devices (also called "cursor control devices"). Output device interfaces 306 enables, for example, the display of images generated by the electronic system 300. Output devices used with output device interface 306 include, for example, printers and display devices, such as cathode ray tubes (CRT) or liquid crystal displays (LCD). Some implementations include devices such as a touchscreen that functions as both input and output devices.

Finally, as shown in FIG. 3, bus 308 also couples electronic system 300 to a network (not shown) through a network interface 316. In this manner, the computer can be a part of a network of computers (such as a local area network ("LAN"), a wide area network ("WAN"), or an Intranet, or a network of networks, such as the Internet. Any or all components of electronic system 300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that some illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for calculating a dynamic delay for an email message in real-time, the method comprising:
    receiving an indication of an email message being created by a user;
    identifying one or more characteristics of the email message in response to receiving the indication;
    determining an impact associated with the email message based at least on one or more of the identified one or more characteristics of the email message or one or more behavioral characteristics regarding the user sending the email message, wherein determining the impact comprises calculating an impact score for the email message based at least on the one or more of the identified one or more characteristics of the email message or the one or more behavioral characteristics regarding the user sending the email message;
    determining the algorithmically controlled delay for the email message based at least on the determined impact, the algorithmically controlled delay comprising a length of time that algorithmically varies with the determined impact and that is proportional to the impact score; and
    delivering the email message to one or more recipients of the email message after the length of time has elapsed.

2. The method of claim 1, wherein the determined impact provides an indication of a likelihood that the user will request to cancel or modify the email message after requesting to send the email message.

3. The method of claim 1, further comprising:
providing a mechanism to the user, which allows the user to cancel or modify the email message during the length of time.

4. The method of claim 1, wherein the receiving the indication comprises receiving an indication that the user has started drafting the email message.

5. The method of claim 1, wherein the receiving the indication comprises receiving an indication that the user is requesting to send the email message.

6. The method of claim 1, wherein the determining the algorithmically controlled delay is performed in real-time while the user is drafting the email message.

7. The method of claim 1, wherein the determining the algorithmically controlled delay is performed once the user requests to send the email message.

8. The method of claim 1, wherein the one or more characteristics include a number of recipients the email message is being sent to, the impact of the email message increases as the number of recipients increases.

9. The method of claim 1, wherein the one or more characteristics includes an importance associated with one or more of the recipients that the email message is being sent to, and wherein the impact of the email message increases according to a number of the one or more recipients having the importance.

10. The method of claim 9, wherein the importance is determined based at least on an organizational chart.

11. The method of claim 1, wherein the one or more characteristics includes content of the email message including one or more of a subject and a body of the email message or content within an attachment of the email message.

12. The method of claim 11, wherein the determining the impact comprises:
performing sentiment analysis based at least on the content of the email message; and
determining the impact of the email message based at least on results of the sentiment analysis.

13. The method of claim 11, wherein the determining the impact comprises:
analyzing the content to determine a number of typographical errors within the email message; and
determining the impact of the email message based at least on the number of typographical errors within the email message.

14. The method of claim 1, wherein the one or more behavioral characteristics include one or more of a number of email messages sent by the user in a given period of time, a time spent on drafting the email message, or a time spent on drafting one or more other email messages.

15. The method of claim 1, wherein the calculating the algorithmically controlled delay comprises determining the algorithmically controlled delay based at least on a proportional-integral-derivative algorithm.

16. The method of claim 1, further comprising:
storing the email message within an outbox at an email message client at a client device of the user, until the length of time is expired; and
sending the email message once the length of time has expired.

17. The method of claim 1, further comprising:
determining that the length of time has expired; and
delivering the email message to one or more recipients of the email message in response to the determining that the length of time has expired.

18. The method of claim 1, further comprising:
receiving a request from the user to deliver the email message during the length of time; and
delivering the email message before the length of time has expired in response to receiving the request.

19. A system for calculating a dynamic delay for an email message in real-time, the system comprising:
one or more hardware processors; and
a machine-readable medium comprising instructions stored therein, which when executed by the hardware processors, cause the processors to perform operations comprising:
receiving an indication of an email message being created by a user to be sent to one or more recipients;
identifying one or more characteristics of the email message in response to receiving the indication;
calculating an impact score associated with the email message based at least on one or more of the identified one or more characteristics of the email message or one or more behavioral characteristics of the user creating the email message;
calculating a dynamic delay for the email message based at least on the calculated impact score, the dynamic delay comprising a length of time that varies proportionally with the calculated impact score; and
causing delivery of the email message to the one or more recipients to be delayed by the length of time of the dynamic delay.

20. A non-transitory computer readable medium comprising instructions stored therein, which when executed by a machine, cause the machine to perform operations comprising:
receiving an indication of an email message being created by a user;
identifying one or more characteristics of the email message in response to receiving the indication, the one or more characteristics including one or more of information regarding a number of recipients of the email message or information regarding a content of the email message;
identifying one or more behavioral characteristics of the user;
determining an impact associated with the email message based at least on one or more of the identified one or more characteristics of the email message or one or more of the identified one or more behavioral characteristics of the user, wherein determining the impact comprises calculating an impact score associated with the email message based at least on the one or more of the identified one or more characteristics of the email message or the one or more of the identified one or more behavioral characteristics of the user; and
calculating a customized delay for the email message in real-time based at least on the determined impact, the customized delay comprising a length of time for delaying delivery of the email message to the recipients of the email message, wherein the length of time varies with the determined impact and the length of time is proportional to the impact score.

* * * * *